United States Patent
Haesendonckx et al.

(10) Patent No.: US 10,696,434 B2
(45) Date of Patent: *Jun. 30, 2020

(54) METHOD AND DEVICE FOR PRODUCING CONTAINERS WHICH ARE FILLED WITH A LIQUID FILLING SUBSTANCE

(75) Inventors: Frank Haesendonckx, Hamburg (DE); Dieter Klatt, Hamburg (DE)

(73) Assignees: KHS GMBH, Dortmund (DE); KHS CORPOPLAST GMBH, Hamburg (DE)

( * ) Notice: Subject to any disclaimer, the term of this patent is extended or adjusted under 35 U.S.C. 154(b) by 773 days.

This patent is subject to a terminal disclaimer.

(21) Appl. No.: 13/982,800

(22) PCT Filed: Nov. 8, 2011

(86) PCT No.: PCT/EP2011/005596
§ 371 (c)(1),
(2), (4) Date: Jul. 31, 2013

(87) PCT Pub. No.: WO2012/103905
PCT Pub. Date: Aug. 9, 2012

(65) Prior Publication Data
US 2013/0307197 A1   Nov. 21, 2013

(30) Foreign Application Priority Data

Jan. 31, 2011 (DE) .................. 10 2011 009 888
Jan. 31, 2011 (DE) .................. 10 2011 009 889
(Continued)

(51) Int. Cl.
*B65B 3/02* (2006.01)
*B29C 49/46* (2006.01)
(Continued)

(52) U.S. Cl.
CPC .............. *B65B 5/02* (2013.01); *B29C 49/46* (2013.01); *B29D 22/003* (2013.01); *B65B 3/02* (2013.01);
(Continued)

(58) Field of Classification Search
CPC .. B65B 5/02; B65B 3/022; B65B 3/22; B29D 22/003; B29C 49/46; B29C 2049/4626;
(Continued)

(56) References Cited

U.S. PATENT DOCUMENTS

| 4,076,071 A | 2/1978 | Rosenkranz et al. |
| 5,346,386 A | 9/1994 | Albrecht et al. |

(Continued)

FOREIGN PATENT DOCUMENTS

| DE | 2352926 | 4/1975 |
| DE | 4212583 | 10/1993 |

(Continued)

*Primary Examiner* — Robert J Grun
(74) *Attorney, Agent, or Firm* — Lucas & Mercanti, LLP; Klaus P. Stoffel

(57) ABSTRACT

Method and device for producing containers which are filled with a liquid filling substance from parisons made from a thermoplastic material, wherein the respective parison is at least conditioned thermally and is subsequently shaped into the container during a shaping and filling phase in a mould by way of at least one liquid filling substance as pressure medium, and wherein, while it is being shaped into the container, the prison is preferably guided at least temporarily through a stretching rod and is stretched in the axial direction.

16 Claims, 10 Drawing Sheets

(30) Foreign Application Priority Data

Feb. 11, 2011 (DE) .................. 10 2011 011 076
Feb. 28, 2011 (DE) .................. 10 2011 012 664
Feb. 28, 2011 (DE) .................. 10 2011 012 665

(51) Int. Cl.

| | | |
|---|---|---|
| *B65B 5/02* | (2006.01) | |
| *B29D 22/00* | (2006.01) | |
| *B29C 49/12* | (2006.01) | |
| *B65B 3/22* | (2006.01) | |
| *B29C 49/06* | (2006.01) | |
| *B29C 49/36* | (2006.01) | |
| *B67B 3/20* | (2006.01) | |
| *B29C 49/58* | (2006.01) | |
| *B29C 49/60* | (2006.01) | |

(52) U.S. Cl.
CPC .............. *B65B 3/022* (2013.01); *B29C 49/06* (2013.01); *B29C 49/12* (2013.01); *B29C 49/36* (2013.01); *B29C 2049/1228* (2013.01); *B29C 2049/465* (2013.01); *B29C 2049/4626* (2013.01); *B29C 2049/4664* (2013.01); *B29C 2049/5841* (2013.01); *B29C 2049/6018* (2013.01); *B65B 3/22* (2013.01); *B67B 3/20* (2013.01)

(58) Field of Classification Search
CPC ... B29C 2049/465; B29C 49/36; B29C 49/06; B29C 2049/4664; B29C 2049/6018; B29C 2049/5841; B29C 2049/1228; B29C 49/12; B67B 3/20
See application file for complete search history.

(56) References Cited

U.S. PATENT DOCUMENTS

| | | |
|---|---|---|
| 5,648,026 A | 7/1997 | Weiss |
| 6,485,669 B1 | 11/2002 | Boyd et al. |
| 7,914,726 B2 | 3/2011 | Andison et al. |
| 2011/0070388 A1* | 3/2011 | Schneider .......... B29C 49/0005 428/36.92 |
| 2012/0266567 A1 | 10/2012 | Haesendonckx et al. |

FOREIGN PATENT DOCUMENTS

| | | |
|---|---|---|
| DE | 4340291 | 6/1995 |
| EP | 0375912 Y | 7/1990 |
| GB | 1474044 Y | 5/1977 |
| JP | 2000043129 | 2/2000 |
| WO | 0119594 A | 3/2001 |
| WO | 2007120807 Y | 10/2007 |
| WO | 2011076167 | 6/2011 |

* cited by examiner

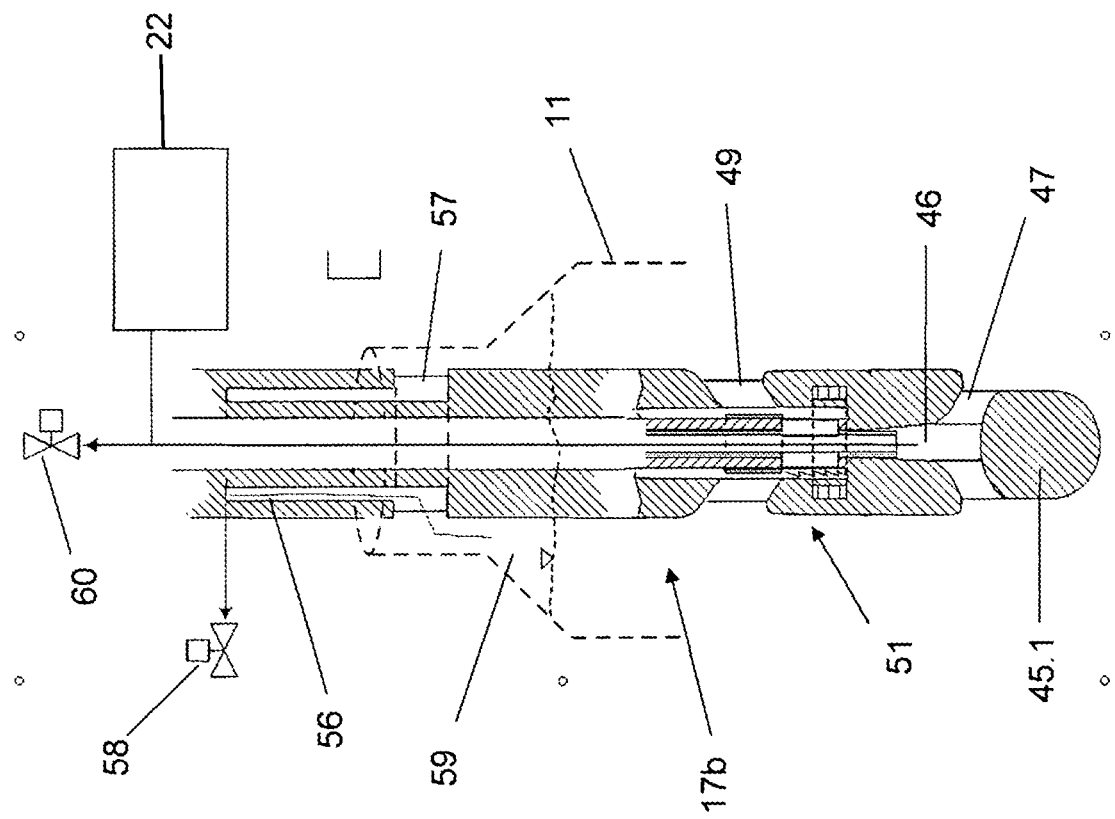

METHOD AND DEVICE FOR PRODUCING CONTAINERS WHICH ARE FILLED WITH A LIQUID FILLING SUBSTANCE

The present application is a 371 of International application PCT/EP2011/005596, filed Nov. 8, 2011, which claims priority of DE 10 2011 009 888.7, filed Jan. 31, 2011, DE 10 2011 009 889.5, filed Jan. 31, 2011, DE 10 2011 011 076.3, filed Feb. 11, 2011, DE 10 2011 012 664.3, filed Feb. 28, 2011, and DE 10 2011 012 665.1, filed Feb. 28, 2011, the priority of these applications is hereby claimed and these applications are incorporated herein by reference.

BACKGROUND OF THE INVENTION

The manufacture of containers by blow molding them out of parisons made of a thermoplastic material, for example out of parisons made of PET (polyethylene terephthalate), wherein the parisons within a blow molder are supplied to various different processing stations (DE-OS 43 40 291). Typically, a blow molder includes a heating unit for tempering or pre-heating (thermal conditioning) of the parisons, as well as a blower device having at least one blowing station, in the area of which the respective parison that has previously been tempered is expanded into a container biaxially or multiaxially. The expansion is effected with the aid of a compressed gas (compressed air) as a pressure medium, which is introduced into the parison to be expanded using cavity pressure. The procedural course during such an expansion of the parison is explained in DE-OS 43 40 291.

The fundamental construction of a blowing station is described in DE-OS 42 12 583. Options for tempering the parisons are explained in DE-OS 23 52 926.

According to a typical processing operation, the containers produced by blow molding are fed into a subsequent filling unit, and filled there with the envisaged product or filling substance. Thus a separate blow molder and a separate filling unit are used. In that respect, it is also known that the separate blow molder and the separate filling machine are combined to form a machine module, i.e. an integral blow filling device, wherein moreover the blow molding and filling up are carried out at separate machinery components and successively.

It has, furthermore, already been proposed to manufacture containers, in particular also in the form of bottles made of thermally conditioned or pre-heated parisons, and, in that respect, simultaneously fill them with a liquid filling substance, which is introduced as a hydraulic pressure medium for expanding the parison or shaping the container with cavity and filling pressure, so that, simultaneously with the filling, the respective parison is deformed in to the container. Such methods, in the case of which simultaneous shaping and filling of the respective container occurs, can also be termed "hydraulic molding procedures" or "hydraulic container molding".

When shaping the container from the parisons through the filling substance itself, i.e. using the filling substance as a hydraulic pressure medium, the only other thing required for shaping and filling the containers is a machine that does, however, have an increased complexity. Initial test results with such devices show, however, that the quality of the containers produced is still clearly below the quality of blow-molded containers produced in a conventional way. The cause of the latter is, among other things, that a large number of process parameters, which are available when carrying out the usual blow molding, either do not exist in the case of hydraulic container molding or have not yet been able to be developed.

With hydraulic container molding, a particular problem also consists in the fact that any pollution of the respective shaping and filling station or of the mound forming such a station, which is designed in a similar way to a blow mold of a blow molding machine for manufacturing containers from thermally conditioned parisons through blow forming with a compressed gas, needs to be avoided. In particular in the case of full or partial carbonation of the filling substance, there is a particular degree of risk of the respective shaping and filling station being polluted through losses of filling substance, in particular when lowering the internal pressure of the container, i.e. when relieving the container of the extremely high cavity and filling pressure on the ambient pressure. Such losses of filling substance are in particular caused by a massive amount of foam being generated when relieving the pressure, so that the simultaneous shaping and filling of containers using parisons and using the filling substance as a pressure medium (hydraulic molding technology), in particular for products containing $CO_2$, could to date not be used.

SUMMARY OF THE INVENTION

The task of the invention is to highlight a method which, with the hydraulic molding procedure, or with the hydraulic container molding, avoids the risk of the respective shaping and filling station becoming polluted, also in the case of a filling substance containing, in particular also at high throughputs (number of containers shaped and filled per unit of time) and/or in the case of the filling substance placed into the respective container having a high $CO_2$ concentration.

In the case of the invention, the filling substance or portions or components of the filling substance are conveyed in at least two process phases or in at least two process phases of the respective shaping and filling phase, with different concentrations of carbon dioxide and/or at different temperatures.

In order to ensure a product quality that is as high as possible, preferably the respective parison is guided, when being shaped, into a container blister that develops, and subsequently into the container possessing the final contour or design, so that a center, typically located in the region of a parison knoll, is defined and positioned reproducibly. Such a defined positioning is important, as, when shaping or expanding the parison in the container, a biaxial orientation of the material of the parison is carried out, and, for this, a targeted and predefinable material distribution within the cladding of the container formed is necessary. With uncontrolled container molding, on the other hand, undesired, and in particular irregular, material distributions are to be expected.

Especially effective guiding during the shaping and filling phase is possible through the use of a stretching rod, wherein the filling substance is, for example, at least partially conveyed through the stretching rod. Alternatively, or in addition, the filling substance can also, at least partially, be conveyed past the stretching rod.

Even hydraulic container molding is achieved through the filling substance being conveyed, at least intermittently, at a constant volumetric flow rate. Options for influencing the material distribution within the cladding of the container emerging or being molded are developed by the filling substance being conveyed, at least intermittently, at a variable volumetric flow rate.

An extremely compact construction is assisted by the container being shaped, filled and closed on a rotating process wheel or rotor.

A further embodiment consists in a setting load generated being measured. Only minor setting loads to be applied by the stretching rod can be guaranteed by a volumetric flow rate of the filling substance being controlled depending upon a setting load measured.

Notwithstanding the aforementioned features, or in addition to such features, the method in accordance with the invention is preferably designed as an enhancement of the invention in such a way that, in the second process phase, the filling substance or the proportion of filling substance is supplied with the higher concentration of carbon dioxide; and/or that the filling substance or the proportion of the components of the filling substance with the greater concentration of carbon dioxide is cooled before being introduced, and, in the second process phase, the filling substance or the proportion of filling substance with the greater concentration of carbon dioxide has a lower temperature than the filling substance or the proportion of the filling substance of the first process phase; and/or that, in a second process phase, the carbon dioxide concentration or CO2 concentration, lies 30%, preferably 50-100%, above the CO2 concentration of the first phase; and/or that the temperature of the filling substance or the proportion of the filling substance of the second process phase is under 10° C., and in particular lies between 4° C. and 8° C.; and/or that the pressure of the filling substance or the proportion of the filling substance possessing the greater CO2 concentration and/or the lower temperature is at least intermittently higher than the pressure of at least one other or the remaining proportion of the filling substance during the shaping process, and in fact is in particular higher by at least 1 bar; and/or that the pressure on a partial line section is greater than the pressure of the filling substance or the proportion of the filling substance possessing the greater carbon dioxide concentration and/or the lower temperature, and in fact preferably is, at least intermittently, 2 bars to 5 bars higher than the pressure of at least one other or the remaining proportion of the filling substance during the shaping and filling phase; and/or that a Venturi nozzle or narrowing of the cross-section is provided for in the melt flow path of the filling substance or the proportion of the filling substance flowing within the stretching rod, wherein the Venturi nozzle is in particular located shortly before said at least one outlet formed on the stretching rod; and/or that a part of the filling substance is conveyed past the stretching rod and on further through the stretching rod; and/or that the proportion of the filling substance with the greater CO2 concentration is cooled; and/or that the proportion of the filling substance with the greater CO2 concentration is conveyed through the stretching rod; and/or that the stretching rod is thermally insulated, at least in some areas, in relation to the filling substance;

wherein the above-mentioned features can each be provided for individually or in any desired combination.

The device in accordance with the invention is preferably designed, in the enhancement of the invention, in such a way that a cooling unit is provided for along a line or line section for such proportion of the filling substance in which carbon dioxide is dissolved downstream, i.e. after being cooled and passing through the line section, or in which the line receives a feed stream from the carbonation unit;

and/or that at least one line section, in which the filling substance or the proportion of the filling substance with the high CO2 concentration is conveyed, is insulated, in particular with insulation that consists of teflon or of material containing teflon; and/or that at least one line section, in which the filling substance or the proportion of the filling substance with the high CO2 concentration is conveyed, is insulated with cladding, for example with teflon or material containing teflon;

wherein the above-mentioned features can each be provided for individually or in any desired combination.

Enhancements, advantages and potential applications of the invention also emerge from the description of embodiments below and from the figures. In that respect, all the features described and/or visually represented, either on their own or in any desired combination, are essentially the subject of the invention, regardless of their being combined in the claims or their retrospective reference. The content of the claims is also made a component of the description.

The expression "essentially" or "approximately" means, within the meaning of the invention, deviations from respective exact values by +/−10%, preferably by +/−5%, and/or deviations in the form of changes irrelevant to the function.

The invention is explained in more detail below based on the figures. The following are shown:

BRIEF DESCRIPTION OF THE DRAWING

FIG. 12 A similar representation to that shown in FIGS. 10-12, being a further modified embodiment of the stretching rod of the shaping and filling machine or station in accordance with the invention.

Figure 1:
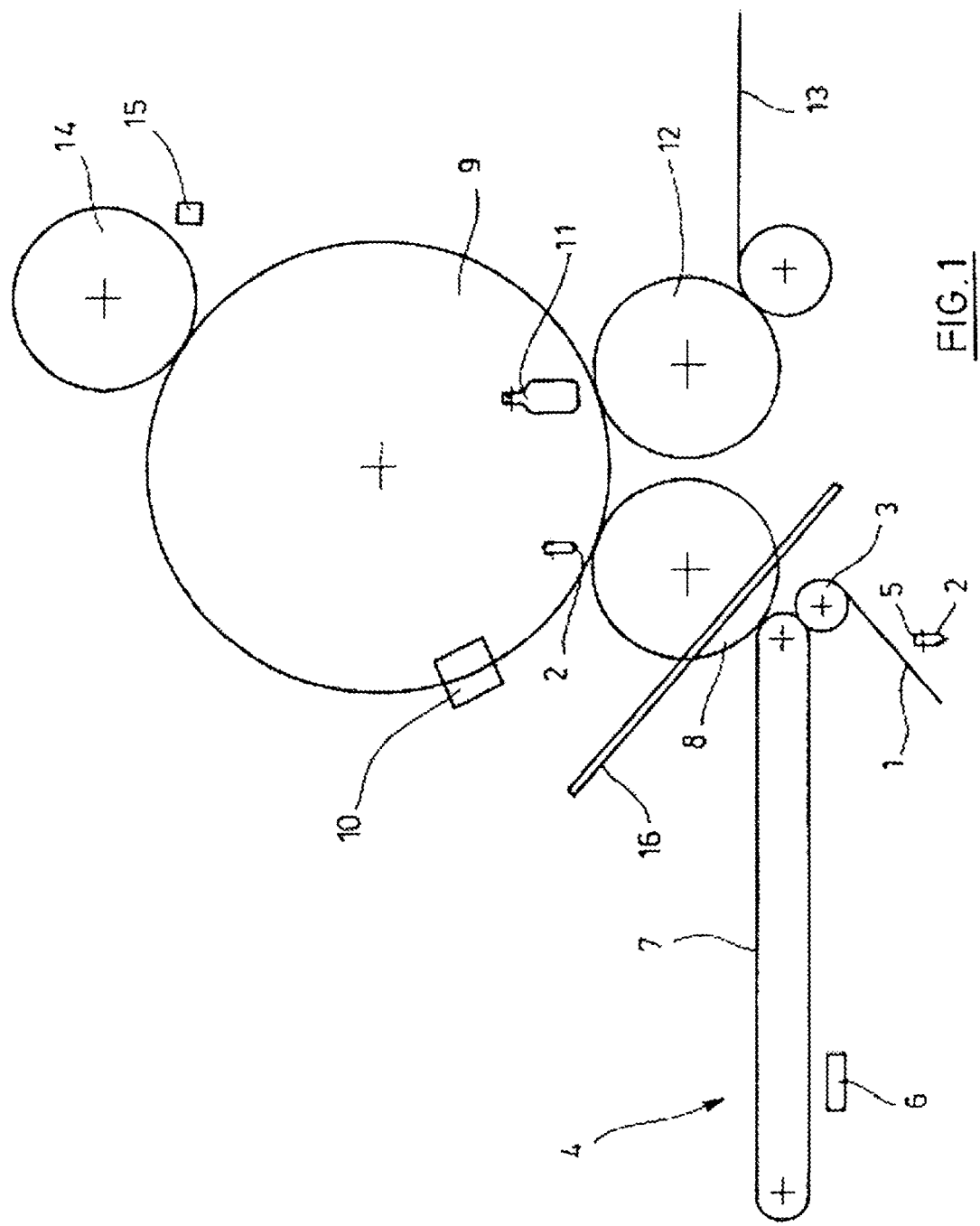
FIG. 1 A schematic representation of a basic construction of a device or a molding and filling machine for carrying out the hydraulic container molding using a filling substance.

The principal construction of a combined shaping and filling device or machine is shown in FIG. 1. Schematically shown parisons (2), also termed "pre-forms", are conveyed by a feeding system (1), using a transfer wheel (3) of a heating apparatus (4). In the field of the heating apparatus (4) in which the parisons (2) are pre-heated or thermally conditioned, the parisons (2) can, for example, depending on their application, be transported upwards, together with their outlet sections (5), in a vertical direction, or also in a vertical direction downwards. The heating apparatus (4) is, for example, equipped with heating units (6), which are located along transport equipment (7). A revolving chain may, for example, be used as transport equipment (7). IR or NIR emitters, as well as other emitters emitting energy, are, for example, suitable as heating units (6).

Following sufficient tempering (also thermal conditioning), the parisons (2) are passed over from a transfer wheel (8) to a rotor or process wheel (9) that can be rotated, i.e. rotationally driven around a vertical machine shaft or to shaping and filling stations (10), which are provided for on the rotor or process wheel (9). The process wheel (9) is equipped with multiple such shaping stations (10), the area of which both the parisons (2) are moulded in the schematically shown containers (11) and the containers (11) are also filled with the filling substance provided for. In this respect, each container (11) is shaped simultaneously with being filled, wherein the filling substance serves as a pressure medium in the case of molds, After being shaped and filled, the containers (11) are transported away from the process wheel (9) by an extraction wheel (12) and conveyed to an output line (13).

In accordance with the embodiment in FIG. 1, means are provided for to convey schematically shown closing elements (15) to the process wheel (9) via an input facility (14). Through the latter, it is possible to also already implement a closure of the containers (11) on the process wheel (9), and handle ready molded, filled and closed containers (11) using the extraction device (12). The closing element (15) may, for example, be constructed as a screw-on closing cap, a crown cap or a heat sealing film.

As material for the parisons (1), preferably different thermoplastic materials can be used. By way of example, polyethylene terephthalate (PET), polyethylene (PE), polyethylene naphthalate (PEN) or polypropylene (PP) may be mentioned. The dimensioning, as well as the weight, of the parisons (2) may be adjusted to the size, weight and/or design of the containers (11) to be manufactured.

In the area of heating apparatus (4), typically a large number of electric and electronic components are arranged. Moreover, the heating units (6) are equipped with moisture-sensitive reflectors. As, in the area of the process wheel (9), the containers are filled and molded using the liquid filling substance, it is to be ensured that unintended seepage of moisture into the area of the heating apparatus (4) is avoided. The latter can, for example, be done by means of a partition (16), which at least functions as a splash guard. It is, furthermore, also possible to appropriately temper transport elements used for the parisons (2) in the area of the transfer wheel (8), or pressurise them with compressed gas in such a way that adherent moisture cannot get into the area of the heating apparatus (4).

The parisons (2) and/or the containers (11) are preferably handled using tongs and/or the outlet section (5), at least in certain areas of clamping or plug-in elements to be pressurized either from the inside or the outside.

DETAILED DESCRIPTION OF THE INVENTION

Figure 2:
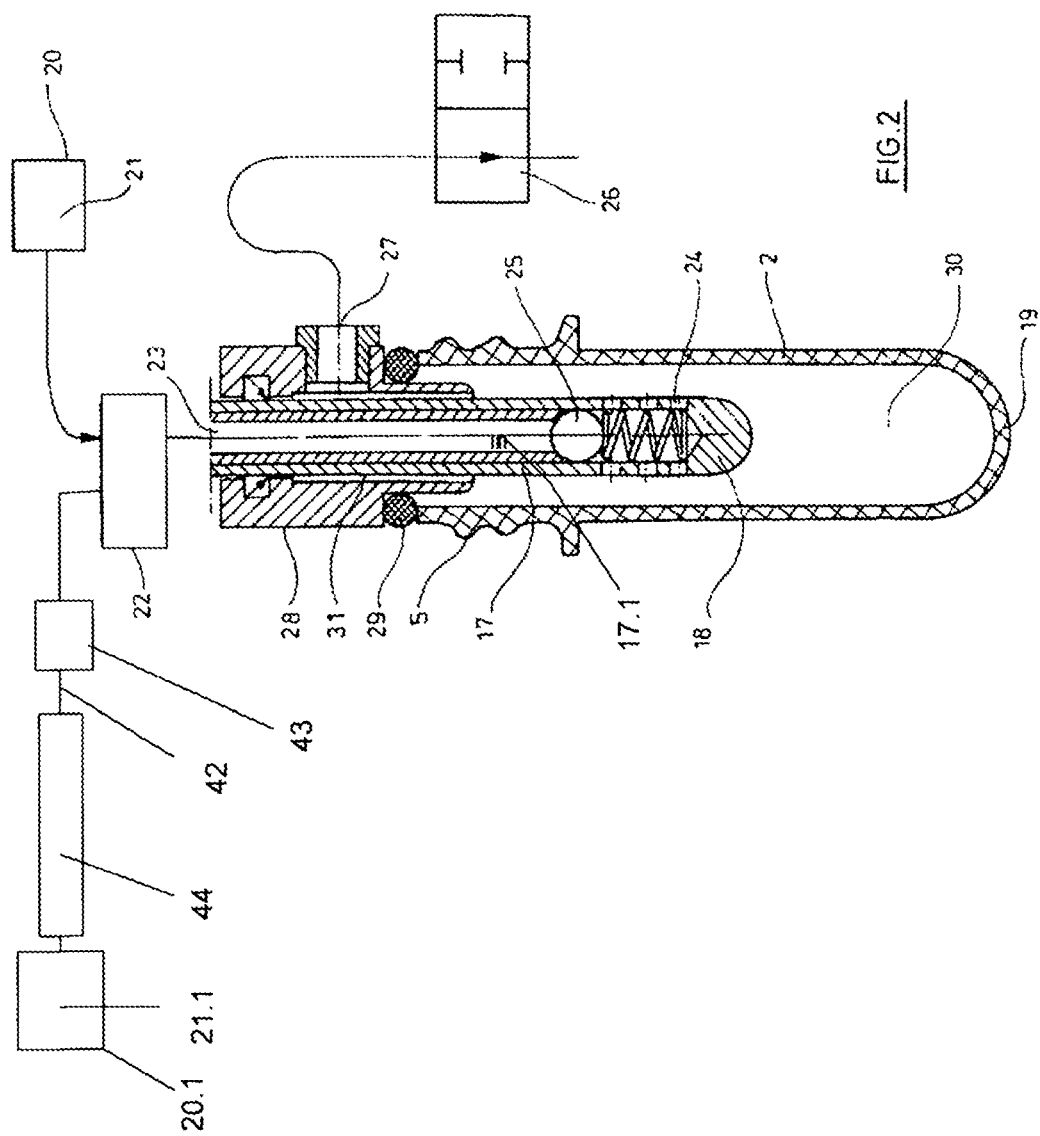
FIG. 2 A schematic longitudinal section through a parison, with partially inserted stretching rod, as well as a venting device.

FIG. 2 shows a longitudinal section through a parison (2), into which a stretching rod (17) is inserted. The stretching rod (17) serves to at least intermittently guide the parison (1) while the container is being shaped (11). Typically, there is contact between a knoll (18) of the stretching rod (17) and a base (19) of the parison (2). If the stretching rod (17) is inserted into the parison (2) further, a longitudinal stretching of the parison (2) is caused. Once the stretching process has been concluded, or, at least temporarily, also while the stretching process is being carried out, a filling substance (21) taken from a supply device (20) is fed into the parison (2).

The filling substance (21) is metered using a multi-port metering valve (22). In the case of the embodiment shown, the stretching rod (17) is, at least in places, hollow, or constructed with a channel, and the filling substance (21) is conveyed into an interior space (23) of the stretching rod (17). In the area of the cladding of the stretching rod (17), outflow openings (24) are placed, which can be blocked against the multi-port metering valve (22) by a back-pressure valve (25). Unintended dripping of the filling substance (21) from the stretching rod (17) can be avoided or minimized in this way.

The parison (2) can be ventilated using and is metered using a multi-port metering valve (26). The air escape valve (26) is connected with an outflow opening (27), which is located in the area of one of the connecting elements (28) exerting pressure on the parison (2). The stretching rod (17) can be positioned through the connecting element (28). The parison (2) is sealed off from the connecting element (28) by a seal (29), which may, for example, be constructed as an O-ring. An interior space (30) of the parison (2) can be connected to the outflow opening (2) via an annular clearance (31). In this respect, the annular clearance (31) encloses areas of the stretching rod (17).

Figure 3:
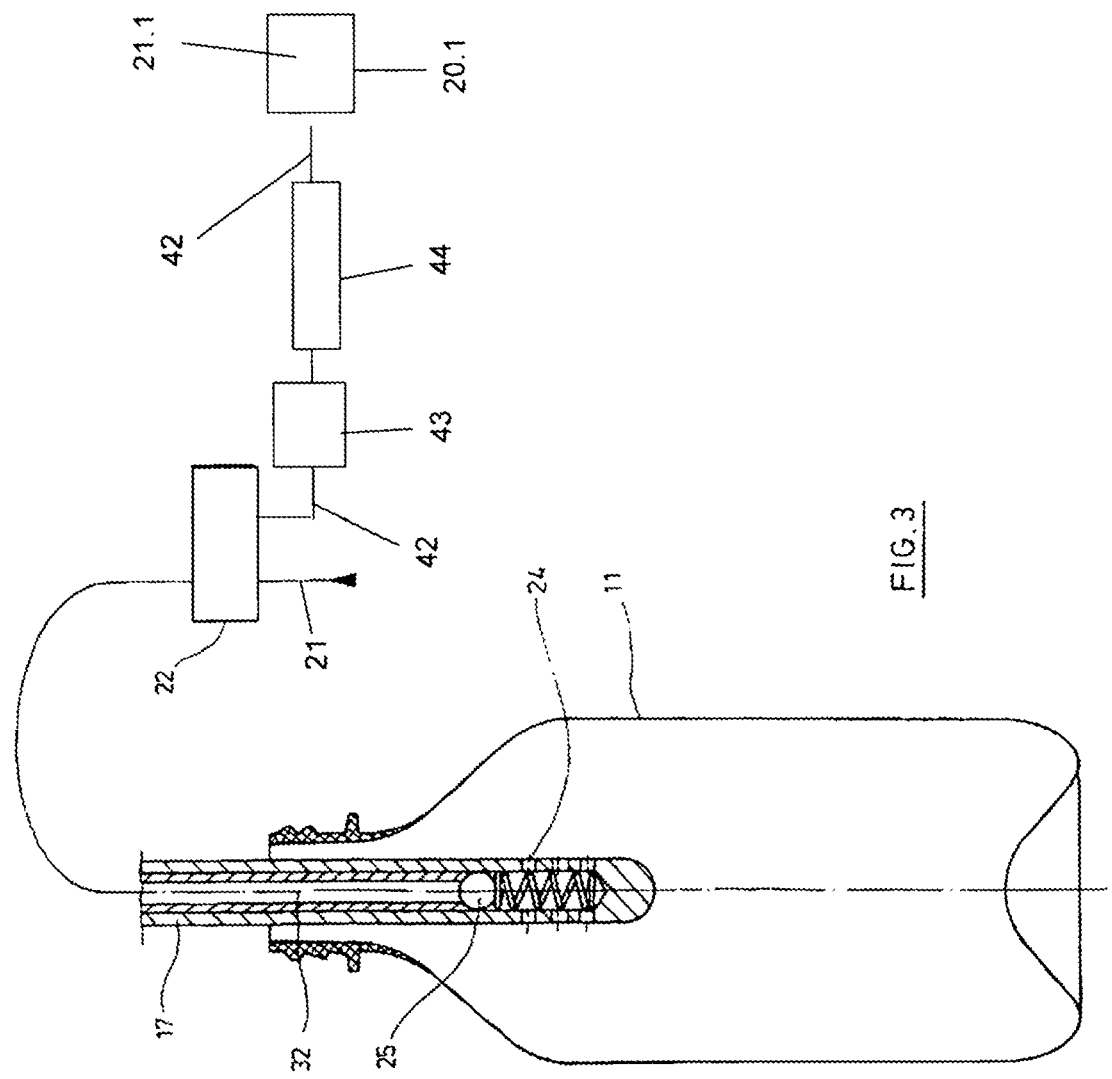
FIG. 3 A schematic longitudinal section through a molded container, with partially inserted stretching and filling device.

FIG. 3 schematically shows a similar device to the one shown in the representation in accordance with FIG. 2 using a hollow stretching rod (17) with an in-built back-pressure valve (25). What is shown, however, is a container (11) that is already ready-formed. It can be recognized in both FIG. 2 and FIG. 3 that, preferably, a plurality of outflow openings (24) is located in the area of the stretching rod (17). In the case of the embodiment shown, such outflow openings (24) are positioned at various different heights along a longitudinal axis (32) of the stretching rod (17). The embodiment shown likewise displays an alignment of the outflow openings (24) with a substantially horizontal outflow direction. Both the arrangement of the outflow openings (24) in the area of the stretching rod (17) and the alignment of the outflow openings (24) can, however, be adjusted. What is typically aimed for is a type of flow pattern that is as quiet as possible and sprays as little as possible.

Figure 4:
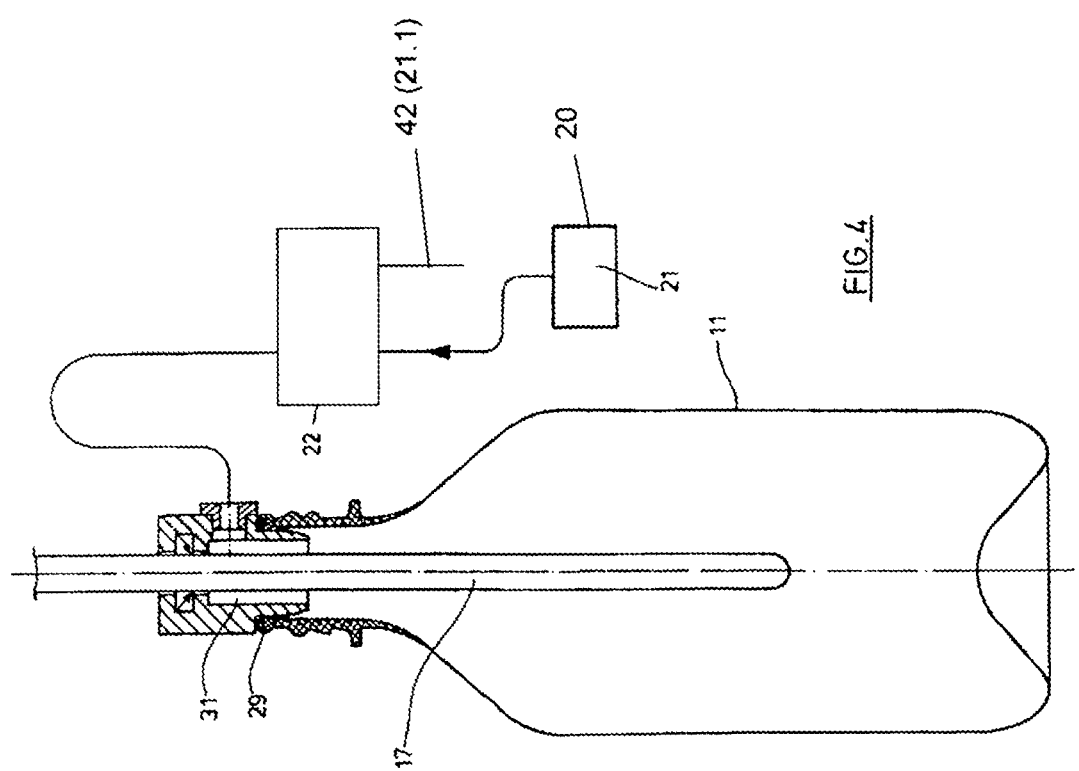
FIG. 4 A longitudinal section through a molding and filling unit or station in the case of a modified embodiment.

According to the embodiment in FIG. 4, a solid stretching rod (17) is used. The filling substance (21) is conveyed past the stretching rod (17) along at least one flow channel. Preferably, the annular clearance (31) is used for this purpose. Also in the case of this embodiment, it is possible to carry out targeted ventilation.

Figure 5:
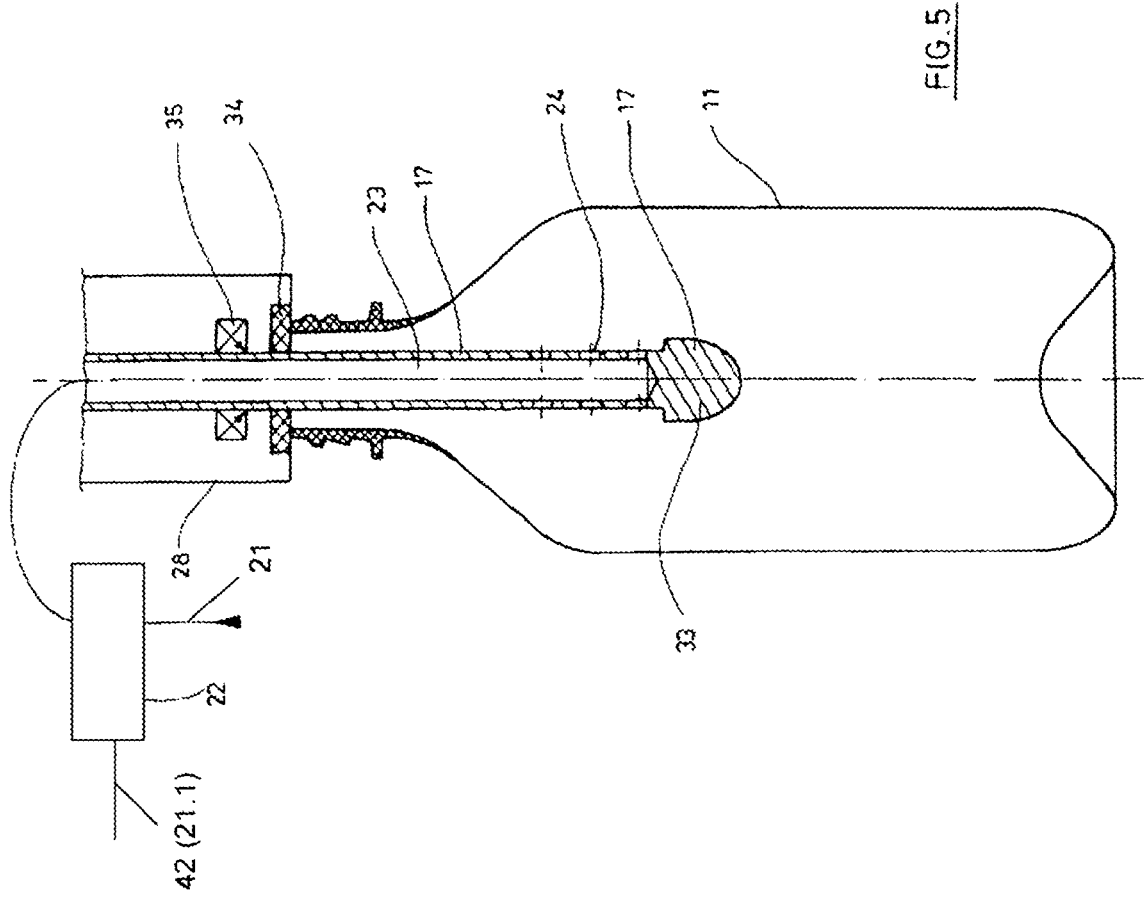
FIG. 5 A longitudinal section through a molding and filling unit or station with a seal to prevent delay yield.

FIG. 5 shows an embodiment in the case of which the stretching rod (17) possesses an embodiment optimized to prevent delay yield. In the area of the knoll (17), a sealing element (33) is located for this purpose. The sealing element (33) can, for example, be provided by enlarging the diameter of the stretching rod (17). A suitable choice of material is likewise conceivable. When withdrawing the stretching rod (17) from the container (11), the sealing element (33) comes into contact with a counterpart (33), which is located in the area of the connecting element (28). The counterpart (34) is preferably designed as a seal. The outflow openings (24) of the stretching rod (17) are, after positioning the stretching rod (17) accordingly, sealed off from the container (11), arranged separately, so that any delay yield from the interior space (23) of the stretching rod (17) can certainly be avoided. Typically, at least one store (35) is arranged in the area of the connecting element (28), for guiding the stretching rod (17).

Figure 6:
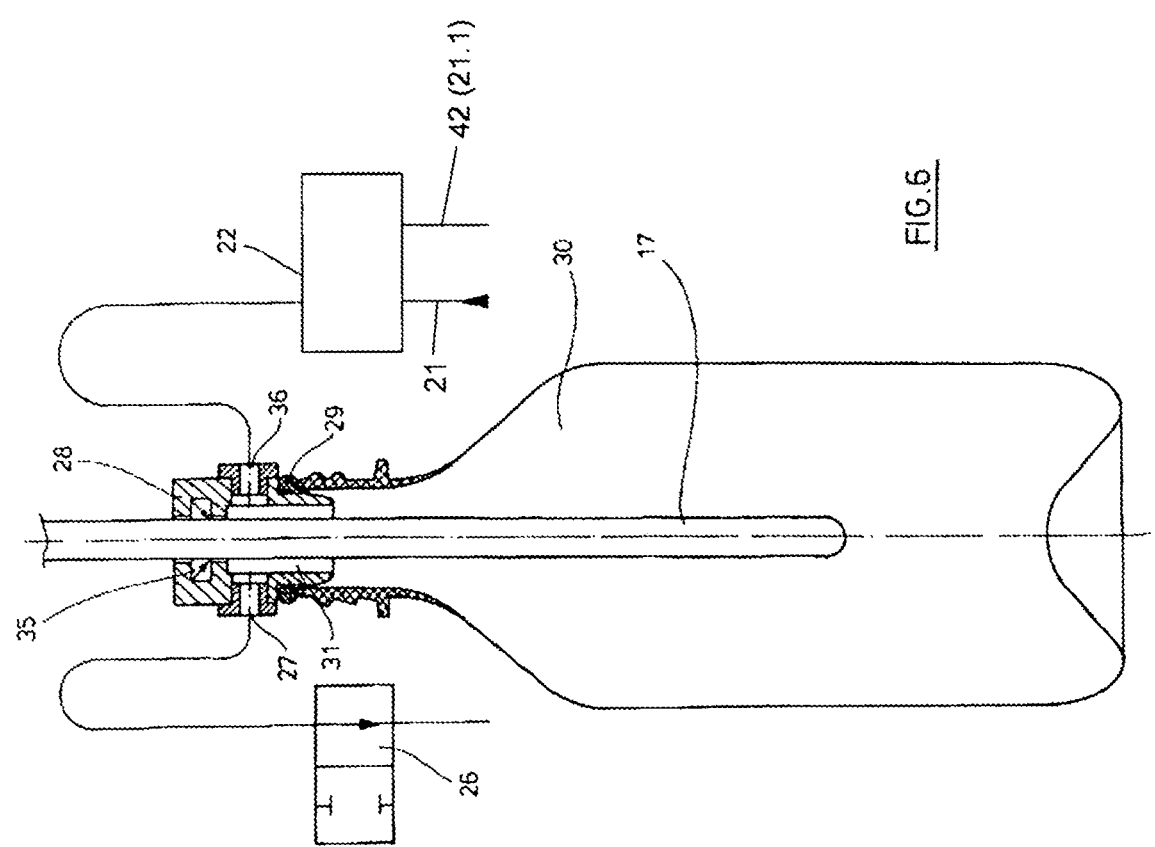
FIG. 6 An embodiment with an adjustable feed for the filling substance and separate, adjustable ventilation.

FIG. 6 shows an embodiment, in the case of which in turn, a solid stretching rod (17) is used. Through flow channels flowing past the stretching rod (17), in particular through the annular clearance (31), both the multi-port metering valve (22) for the filling substance (21) and the air escape valve (26) are connected to the interior (30) of the parison (2) or the container (11). In the case of the embodiment shown, the outflow opening (27) is located, in a radial direction of the connecting element (28) opposite a feed opening (36) that is connected to the multi-port metering valve (22).

Figure 7:
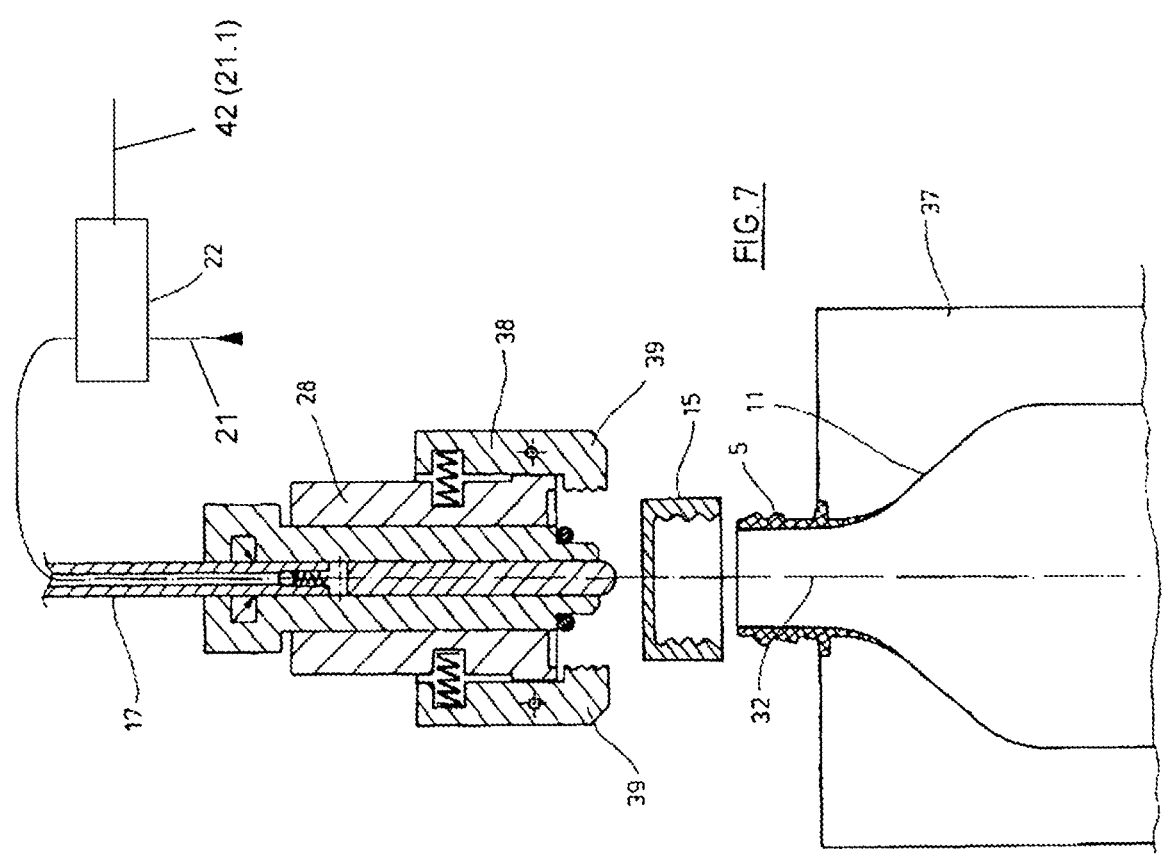
FIG. 7 A schematic representation of a combined shaping, filling closing system or station.

FIG. 7 shows an embodiment in the case of which the container (11) is also closed in the area of the process wheel (9) in accordance with FIG. 1. The container (11) is, in this respect, still located in the area of a mold (37), which forms a part of the shaping station (10) in accordance with FIG. 1. A closing system (38) is, in the case of this embodiment, located coaxially to the connecting element (28) in regard to the longitudinal axis (32). The closing system (38) possesses, for example, grippers (39), arranged in such a way that they can be swiveled, which are provided for in order to exert pressure on the closing element (15). It is in particular intended to place the closing system (38) so that it can be moved rotationally in relation to the connecting element (28). As a result, the closing element (15) can be screwed onto a male thread of the outlet section (5) by means of a female thread.

Figure 8:
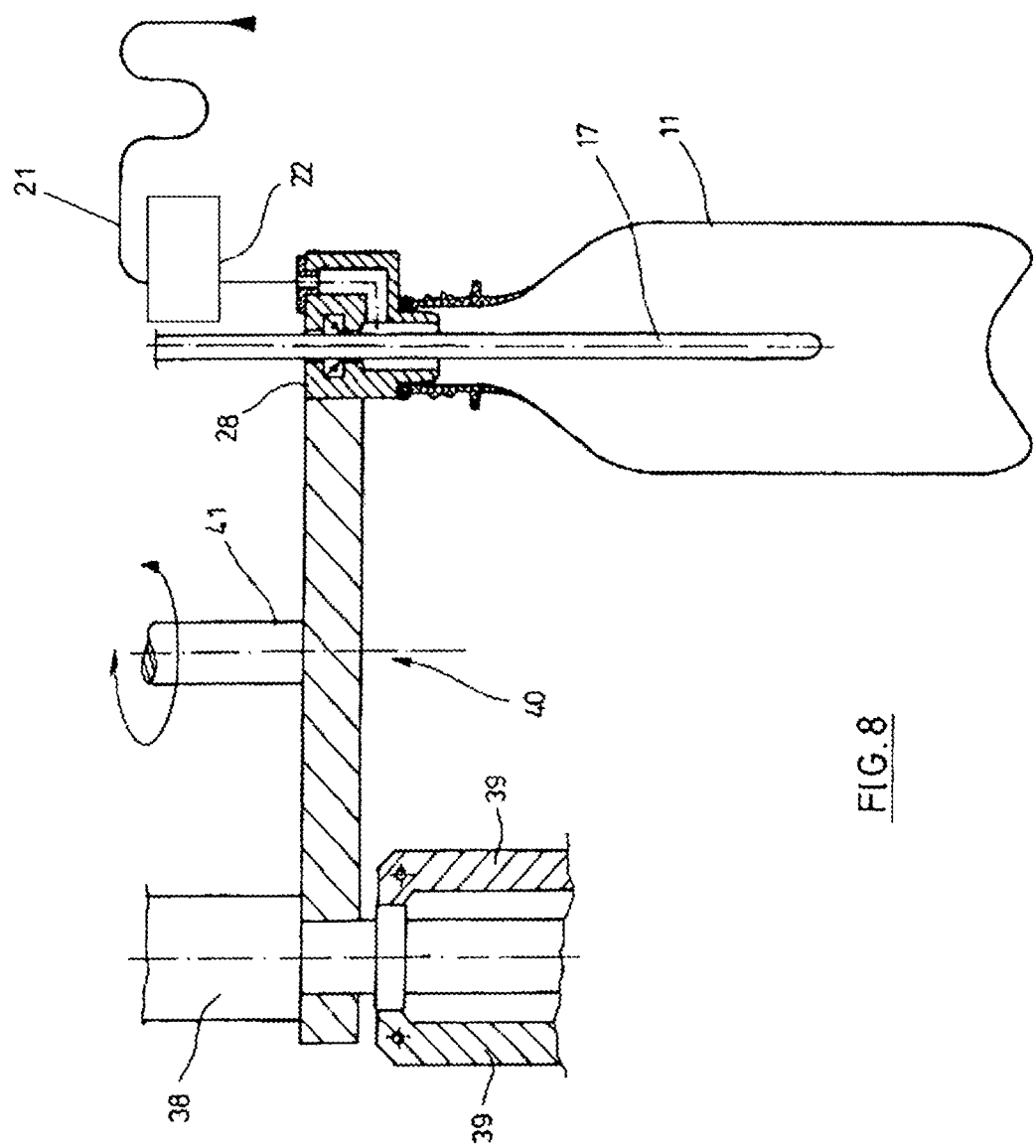
FIG. 8 Another embodiment of the combined shaping, filling and closing system or station in accordance with FIG. 7.

FIG. 8 shows an alternative embodiment for construction in accordance with FIG. 7. The closing system (38) and the connecting element (28) are, in this case, not placed coaxially in relation to one another, but are alternately positioned by a tool tray (40) in a work configuration and/or a rest configuration. The tool tray (40) can, for example, be designed in a revolver-style arrangement and with a rotary axis (41).

Some typical process parameters are, for example, detailed below. The filling substance (21) is conveyed to the connecting element (28), preferably at an ambient temperature, for example in the range of 20° C. to 30° C. As a result, the filling substance (21) cools the material in the container (11), and assists a rapid form stability of the container (11) molded. This therefore supports a very short cycle time. It is, however, likewise possible to convey the filling substance (21) so that it is cooled or heated to a greater degree.

During the process of the container (11) being molded, the filling substance (21) can, at least temporarily, be conveyed into the shaping process or the container (11) at a constant volumetric flow rate. It is, however, also possible for the volumetric flow rate to specify a suitable time profile, in such a way that volumetric flow rates are generated at different intensities at different points in time.

Prior to introducing the filling substance (21), it is possible to extract any air to be found within the parison (2) and/or replace it by an inert gas. The latter is in particular recommended in the case of filling media (21) that are susceptible to oxidation.

Either pure liquids or liquids containing additives can be used as a filling substance (21). In particular, the possibility of conveying carbonated filling media is taken into consideration. As the filling substance (21) is conveyed to the parison (2) or the container (11) under pressure, for example with a pressure of 10 bar, it proves expedient to design any melt flow paths for the filling substance (21) in such a way that local decompressions due to the flow processes are avoided. A local or temporary decompression could otherwise lead to the outgassing of carbon dioxide.

As an alternative to the heating of—preferably injection molded—parisons (2) shown in FIG. 1, it is also possible to produce the parisons (2) directly prior to their being shaped in the container. This can, for example, be done by means of an injection molding process, such as in the case of a so-called single-stage injection blowing process. Compression molding is likewise possible. Such molding of the parisons (2) avoids the use of electrical and electronic components in the area of a heating apparatus, or at least considerably reduces the scope of use of such components, since the latter are then only still required for any temperature profiling required.

As materials for the components of the process wheel (9), preferably non-corrosive materials are used. It is in particular envisaged that rustproof steels, as well as plastics, will be used. It is especially envisaged that the molds (37) will be constructed, in whole or in part, from a suitable plastic.

To minimize the setting loads required, it is envisaged that the stretching process will be assisted by the filling substance (21) being supplied. In the case of such assistance, it is, however, to be ensured that the guiding of the parison (2) through the stretching rod (17) is ensured. The latter can, for example, be done by the setting load applied being measured, and the volumetric flow rate of the filling substance (21) being controlled in such a way that a minimum setting load is always maintained. In the case of electrically driven stretching processes, the size of the setting load can, in particular, be ascertained in a very simple way by measuring the actuating current or, in the case of pneumatic stretching processes, through a pressure measurement.

When filling containers (11) with the filling substance (21), it is frequently desired to provide a gas-filled headspace after sealing the container (11). This free headspace can be generated through the reduction in volume resulting from withdrawing the stretching rod (17).

The choice of material already explained above is in particular also made taking into consideration existing hygiene requirements. In this respect, a sterilized environment is guaranteed. A structural design is likewise carried out in such a way that the requirements of good cleaning capability are fulfilled.

One or more of the transfer wheels may be equipped with servo drives.

Through the latter, in particular implementing a complete separation of the heating apparatus (4) from the process wheel (9) while cleaning operations are being carried out is in particular assisted. It is likewise envisaged for retractable handling elements to be arranged in the area of at least one of the transfer wheels. Further moisture-proofing can only be carried out through the use of a dry air tunnel.

By way of example, a specific process sequence is described below. Prior to or after inserting the parison (2) into the mold (37), firstly a gas exchange takes place in the interior of the parison, in order to in particular block out oxygen or reduce the proportion of oxygen. One instance of rinsing and/or evacuating typically lasts for at the most 0.1 secs. The stretching of the parison (2) using the stretching rod (17) typically lasts 0.2 secs. A period of around 0.2 seconds is likewise envisaged for the filling and the resulting shaping of the parison (2) in to the container (11). For subsequently creating a headspace, typically a maximum period of 0.2 secs is required. The process of deoxidizing and relieving the pressure on the filled container occurs extremely rapidly in the case of non-carbonated beverages. In the case of carbonated beverages, this process can take a period of up to 5 seconds.

The headspace can be treated subsequently, for example, using high pressure foaming or an admixture of nitrogen. The subsequent conveying of a closing cap can, in the case of carbonated drinks, take a period of up to 1.5 seconds. The processing of closing the bottle or screwing on the cap can, for example, take a period of 1.5 seconds.

After the container is finally sealed (11), the mold (37) opens, and the filled container (11) is removed and transported away.

While the filling substance is being conveyed into the parison (2) to be shaped or the container (11) still in the process of being shaped, as a rule a typical pressure flow arises in the filling system or in the parison (2) or the container (11) still in the process of being molded. Due to the expansion of the container (11), initially a comparatively low pressure exists, which rises towards the end of the shaping process. The corresponding rise in pressure or the amount of the rise in pressure in the filling system, in particular in the filling pipe, can be used as a control factor for a subsequent procedural step, and, if necessary determine the point in time of said next procedural step being initiated. Alternatively, or in addition, it is also envisaged to use the characteristic of the pressure flow and/or the volumetric flow rate of the filling substance as control factors.

In regards to the temperature of the filling substance, it is in particular envisaged that the filling substance be conveyed with an ambient temperature. Depending upon the respective basic application conditions, however, an increase in temperature or a drop in temperature are also conceivable in regard to filling the containers at an ambient temperature.

According to a further variant, it is envisaged that the filling process be carried out in two stages, wherein, during the first processing stage, the filling substance is conveyed at a temperature which is higher than the temperature during the second processing stage. The first procedural step may, for example, be carried out if the longitudinal stretching of the parison (2) is carried out via the stretching rod (17). The second procedural step then follows the stretching process being carried out, and corresponds to the transverse expansion of the container (11).

In the case of the deoxidization in the headspace already briefly mentioned above following the decompression, it is also envisaged to, if necessary, carry out an extraction of gases and/or foams that form.

In regards to the closure of the ready formed and filled containers (11), various different variants can likewise be implemented. In the case of one variant, it is possible to equip a part of the treatment or shaping and filling stations (10), on the rotor or process wheel (9), with a revolver-like head. The revolver-like head on the one hand comprises a blowing or molding and filling head and, on the other hand, a capping head. This corresponds to the schematic representation in FIG. 8. It is, however, likewise conceivable to use an integrated construction, in the case of which the respective head implements the blowing, filling and capping processes.

According to a further variant, the molding and filling head and the capping head are in fact designed as separate components, however are arranged on every molding and filling station (10) in such a way that they can be swiveled. According to a third variant, only the molding and filling head is located on the rotor or process wheel (9), and the container that is still open is passed on to a separate closing device, for example to a transport wheel that is equipped with a capping head.

The application of the closing elements (15), for example the closing caps, may, for example, be carried out directly after opening the respective mold (37) and gripping the container (11) by means of a holding and gripping element. An advantageous variant consists in keeping the mold (37) closed, and thus fixing the container (11) in the correct position, wherein only the outlet is released for a closing element. This release is effected by either the mold (37) for an angle trajectory being taken to a radially different position or the molding and filling head being swiveled and/or moved in such a way that the container outlet is open to receive a closing element.

As a result, the closing caps would therefore be relinquished on the rotor or process wheel (9). It is in particular envisaged that the outlet area of the filled container (11) be pressurized with an inert gas prior to the closing elements (15) being relinquished.

To keep the description simple, it has been assumed above that only one supply device (20) is provided for, for the filling substance (21). In fact, the shaping and filling device or machine does, however, possess a further supply device (20.1) for a further part or a further component of the filling substance, which possesses a greater $CO_2$ concentration than the filling substance (21) and is designated below with (21.1).

It has proven to be especially advantageous if an underlayer is achieved in the course of the aforementioned procedures, and in fact in particular with regard to affixing the part or component of the filling substance (21.1) containing $CO_2$ or with the higher $CO_2$ concentration. To be specific, it has transpired to be problematic, in the event of full or partial carbonation of the filling substance, to design the rapid decompression following the shaping and filling of the container (11), from the high molding and filling pressure to the closure of the respective container, for example at ambient pressure, without any product loss. A massive amount of foam generation with product loss occurring as a result has to date prevented the use of this hydraulic molding technology for products containing $CO_2$.

According to an awareness underlying the invention, to avoid such product losses it is, inter alia, especially advantageous if the filling substance (21) or (21.1) or the proportion of the filling substance (21) of (21.1) is conveyed in at least two process phases with different $CO_2$ concentrations and/or at different temperatures. In this regard, it is expedient to convey the filling substance or the filling substance components (21.1) with the greater carbon dioxide concentration in a second or subsequent process phase. This has the advantage that the filling substance (21) and (21.1) in the emerging container (11), in combination, does in fact form the hydraulic pressure medium for forming the container (11), however the filling substance (21) already contained in the container (11) being formed has deoxidized, or largely deoxidized, and when the filling substance (21.1) or the proportion of filling substance (21.1) having the greater $CO_2$ concentration is introduced, first of all further solution processes take place in the fluid volume. In that respect, the second or subsequent process phase is, for example, a process phase concluding the shaping and filling phase. The introduction of the filling substance (21.1) or the proportion of filling substance (21.1) having the higher CO2 concentration into the liquid volumes already existing is preferably implemented at a lower level, for example, in the area of the base of the emerging container (11). The introduction of the filling substance components or the filling substance (21) and (21.1) is controlled by the multi-port metering valve (22).

One variation consists in cooling the filling substance (21.1) or the proportion of filling substance (21.1) with the greater concentration of carbon dioxide prior to its being introduced, and then, in the second process phase mentioned, introducing the filling substance (21.1) or the corresponding proportion with the greater concentration of carbon dioxide at a lower temperature than the filling substance (21) or the proportion of the filling substance (21) of the first process phase into the emerging container (11). Also solely for this reason, an under-layer is introduced, with a filling substance that is rich in CO2, whereby foam generation, also foam generation when decompressing the containers, is at least reduced to the extent that no disadvantageous product losses occur.

In that respect, if possible the concentration of carbon dioxide in the second process phase should be 30% above the carbon dioxide concentration in the first process phase, in particular 50-100% above the carbon dioxide concentration in the first phase. Ideally, in the first or preceding process phase a still, i.e. CO2-free filling substance component, filling substance (21), and, in the second process phase, a CO2-rich filling substance component, i.e. the filling substance (21.1), are introduced into the emerging container (11).

One variant consists in the temperature of the filling substance (21.1) or the proportion of the filling substance (21) of the second process phase being cooled, or being at least 10° C. below the temperature of the first or a preceding process phase, in particular amounting to less than 10° C. and ideally being between 4° C. and 8° C.

It has proven to be advantageous if the pressure of the filling substance (21.1) or the proportion of the filling substance (21.1) possessing the greater carbon dioxide concentration and/or the lower temperature is at least intermittently higher than the pressure of at least one other or the remaining proportion of the filling substance (21) during the molding process or during the shaping and filling phase, and in fact preferably by at least 1 bar.

Furthermore, the pressure on a line section (42) or a part of the line section, via which the filling substance (21.1) or the proportion of the filling substance (21.1) with the higher carbon dioxide concentration and/or with the lower temperature is conveyed, should be greater than the pressure of the remaining filling substance (21) or the remaining part of the filling substance (21), and in fact, at least intermittently, be 2 bar to 5 bar higher during the molding process.

One embodiment stipulates that a Venturi nozzle or narrowing of the cross-section is provided for on the melt flow path of the filling substance (21) and (21.1) flowing within the stretching rod (17), wherein the Venturi nozzle is located in the direction of flow of the filling substance (21) and (21.1), for example shortly before at least one outlet (24) of the stretching rod (17). Thus, the advantageous high pressure is retained until shortly before the first decompression. The latter can even be increased if a part of the filling substance (11) is conveyed past the stretching rod (17) and a part of the filling substance (11) through the stretching rod. In that respect, for reasons of expediency the filling substance (21.1) containing the greater carbon dioxide concentration should be conveyed through the stretching rod (17). It is also advantageous if the stretching rod (17) is thermally insulated, at least in some areas, in relation to the filling substance (21) and (21.1).

Thus, for manufacturing filled containers (11) from a thermoplastic material, the shaping and filling device or machine thus comprises inter alia at least one heating section or heating device (4) located along a transport route of a parison (2) and at least one shaping and filling station (10) equipped with a mold.

Furthermore, the shaping and filling device or machine comprises, inter alia, a liquid supply unit (1) for the filling substance (21) and (21.1) to be filled into the containers (11), as well as a carbonation unit (43), which is, for example, provided for in the line section (42), and with which carbon dioxide can be dissolved, at least in the partial current of the filling substance (21.1), wherein the shaping and filling station (10) possesses a guiding assembly in the form of a stretching rod (17), which, at least intermittently, pressurizes the parison (2) during the time that it is being shaped in to the container (11), and at least one part of the filling substance (21) can be conveyed through the channel or interior space (23) of the stretching rod (17). At least one outlet opening (24) of the channel or interior space (23) is provided at the lower end of the stretching rod (17).

Advantageously, a cooling unit (44) is provided at least along the line section (42) for the filling substance (21.1), in which carbon dioxide is dissolved downstream or flows from the carbonation unit (43).

In this respect, at least the line section (42), in which the carbon dioxide-rich filling substance (21.1) or a proportion thereof is conveyed should at least be thermally insulated on a partial length, for example with insulation made of teflon or a material containing teflon, and/or be clad with thermal insulation, for instance with teflon or a material containing teflon.

Figure 9:
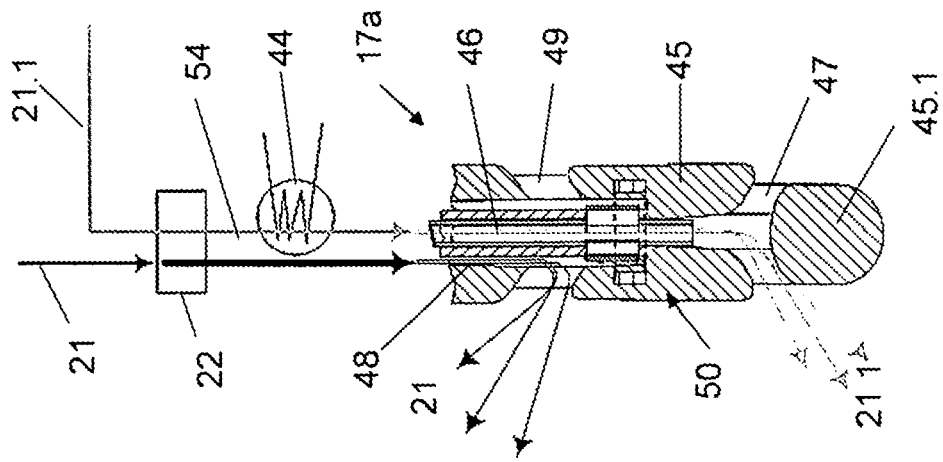
FIGS. 9-11, each as a schematic sectional representation, a further embodiment of the stretching rod of a shaping and filling machine or station in accordance with the invention during different process phases.
Figure 10:
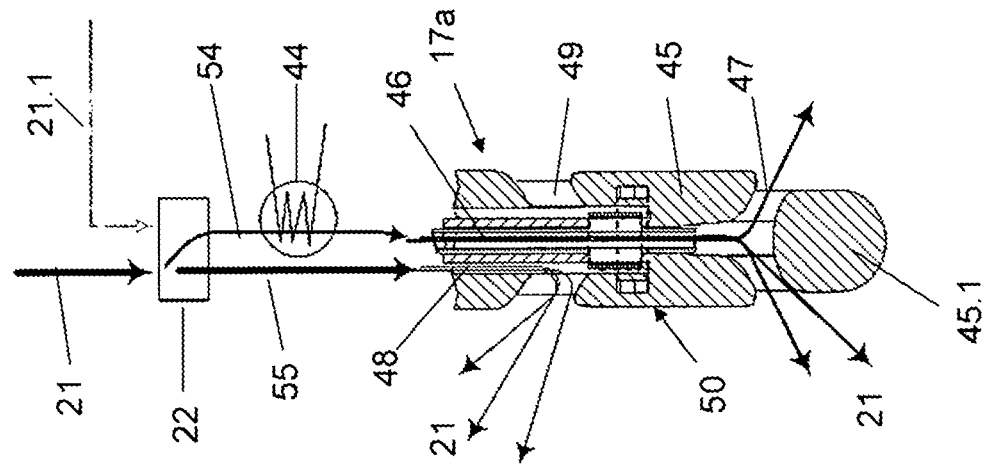
Figure 11:
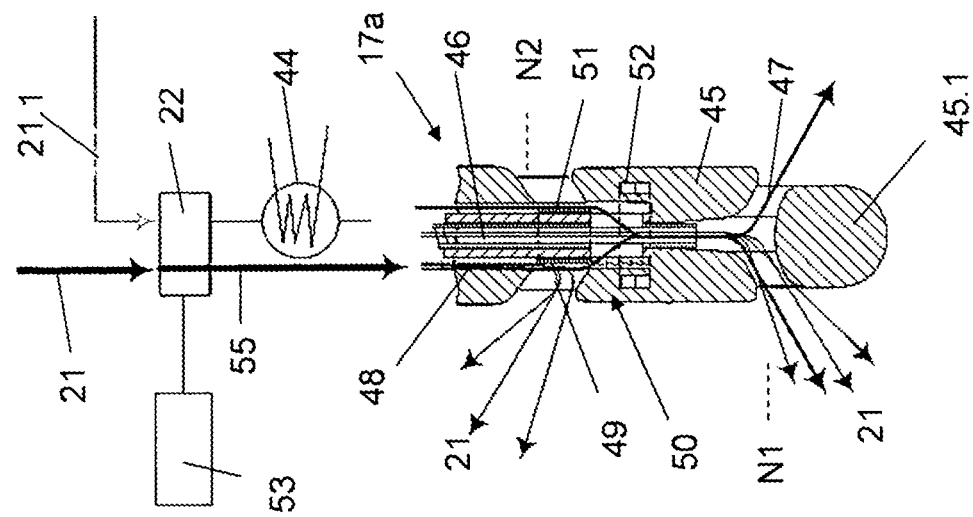

FIGS. 9-11 show, as a partial representation and as a section, a stretching rod 17a, which, in regard to its basic function, corresponds to the stretching rod 17, i.e. when the respective container (11) is molded and filled, serves to guide and control in particular the axial stretching of the respective parison (2) or the emerging container (11). The stretching rod (17a) primarily consists of a rod-shaped stretching rod body (45) with a rounded free stretching rod end (45.1). Multiple channels are constructed in the stretching rod body (45), and in fact an inner channel (46) located along the longitudinal axis of the stretching rod (17a), which, near the end (45.1), flows into multiple outlet openings distributed around the axis of the stretching rod (17a) on the lower level N1, as well as an external, annular channel (48) surrounding the inner channel (46), that is separate from this inner channel, which flows into multiple upper outlet openings (49) distributed around the axis of the stretching rod (17a) at the peripheral surface or girthed area of the stretching rod (17a) on the upper N2 level. Furthermore a control valve, that is generally designated (50) in FIG. 9, is provided inside the stretching rod (17a), and this control valve makes it possible to produce or interrupt a connection between the inner channel (46) and the outer channel (48). In the case of the embodiment shown, the control valve (50) is largely formed by a locking ring (51) that can be moved axially, which is, for example, pretensioned by a spring not detailed in its position (accentuated in FIG. 9) allowing for a free connection between the channels (46) and (48). Through an actuator, for example through a magnetic coil (52) accommodated in the stretching rod (17a), the locking ring (51) can be moved against the impact of the spring in its lower position, interrupting the connection between the channels (46) and (48).

Moreover, in FIGS. 9-11 the multi-port metering valve (22) controlled by an electronic control unit (53), which is in turn designed as a manifold valve, is shown, which is connected to a first terminal or entry point with the supply device (20) for the filling substance (21) not shown in FIG. 9 and to a second terminal with the supply device (20.1) for the filling substance (21.1) likewise not shown in FIG. 9. The outlets of the multi-port metering valve (22) are connected, via a liquid connection (54), with the inner channel (46) or, via a liquid connection (55), with the external annular channel (48). The cooling unit (44) is located in the liquid connection (54). The control valve (50) or its magnetic coil (52) is controlled via the control unit (53), wherein the control valve (50), in the variant shown, is designed as an electromagnetic, linear-driven system. This has the special advantage that the closing and opening speeds can be regulated continuously. It is, in that regard, not necessary for the control valve (50) to be designed to be 100% sealed off; a small quantity of leakage can be tolerated.

With the stretching rod (17a), various methods of working are possible, and in fact, for example, the simultaneous introduction of the filling substance, e.g. the filling substance (21) with no CO2 content or with a reduced $CO_2$ concentration, at the lower height (N1) via the outlet openings (47) and at the higher height (N2) via the outlet openings (49) into the parison (2) or into the containers (11) taking shape. For this purpose, the control valve (50) is opened through a corresponding activation of the control unit (53) for a connection of the two channels (46) and (48) and, moreover, the multi-port metering valve (22) is activated by the control unit (53) in such a way that, via this metering valve, only one connection to the liquid connection (55) exists. This operating status is shown in FIG. 9.

In the case of a closed control valve (50), it is, furthermore, possible, by correspondingly activating the multi-port metering valve (22) via this valve for the filling substance (21), to produce a connection to both channels (46) and (48), so that the filling substance (21) is, in turn, introduced into to the parison (2) or into the containers (11) taking shape, in accordance with the whistling, via the outlet openings (47) and (49) at the different heights N1 and N2. In this operating state, shown in FIG. 10, the possibility, moreover, exists, to cool the partial quantity of the filling substance (21) conveyed to the inner channel (46) and seeping out from the lower outlet openings (47) in the cooling unit (44), or, alternatively, to cool the liquid connection (54) for a chronologically subsequent procedural step with the filling substance.

Moreover, the possibility exists, by correspondingly activating the multi-port metering valve (22), to extract the filling substance (21.1) via the liquid connection (54) in the inner channel (46) for the discharge exclusively at the lower outlet openings (47) or at the height N1, and the filling substance (21) for the discharge exclusively at the upper outlet openings (49) or at the higher height N2, wherein the extraction of the filling substance (21) and (21.1) occurs either simultaneously, with a time delay or temporally overlapping, and in fact with a time-delayed or chronologically overlapping extraction, preferably in the form that the filling substance (21.1) is firstly extracted via the upper outlet openings (47) and then via the lower outlet openings (49). This operating state, in the case of which, in turn, the filling substance (21.1) is cooled in the cooling unit (44), is shown in FIG. 11. Naturally, the various operating states shown in FIGS. 9-11 can be combined as desired at the respective shaping and filling phase.

For example, it is possible, during the respective shaping and filling phase, to, in a first partial or process phase in accordance with FIG. 9, introduce the filling substance (21), via the outlet openings (47) and (49), in a chronologically consecutive second partial or process phase in accordance with FIG. 10 to, moreover, introduce the filling substance (21) via the outlet openings (47) and (49), and, in that respect, to simultaneously pre-cool the filling substance (21) flowing through the liquid connection (54) with the cooling unit (44), and then, in a third partial or process phase in line with FIG. 11, to introduce the filling substance (21.1) via the lower outlet openings (47), wherein, for example, the filling substance (21) is, moreover, extracted via the upper outlet openings (49).

In each of the cases, a deoxidized interim zone is formed between the heights N1 and N2, which delimits the parts of the filling substance from one another. In that regard, the aforementioned electromagnetically driven control valve (50) has a beneficial influence, because it enables low-impulse and thus low-dilution switching. A further advantage of this electromagnetically driven control valve (50) consists in its being very robust, and, for cleaning purposes, with corresponding cleaning cycles, being able to be very easily cleaned through rapid and, if necessary, repeated switching.

FIG. 12 shows, as a simplified sectional representation of a further embodiment, a stretching rod (17b), which essentially only differs from the stretching rod (17a) through the fact that, in addition to the two channels (46) and (48), a third, annular channel (56) is provided for in an upper region located more remotely from the end of the stretching rod (45.1), which flows into multiple outlet or discharge openings (57) at the peripheral surface or girthed area of the stretching rod (17b) distributed around the axis of the stretching rod (17b). Via the channel (56), for example, controlled by a control valve (58) activated by the control unit (53), after the shaping and filling of the respective container (11) the decompression of the headspace (59) formed in the container (11) via the filling level occurs via the outlet openings (47)—and, in the case of an opened control valve (50), also via the outlet openings (49)—a further decompression of the container (11) following the shaping and filling is, for example, possible, controlled by a control valve (60) driven, for example, by the control unit (53).

The stretching rods (17a) or (17b) shown in FIGS. 10-13 or the shaping and filling devices or machines featuring these stretching rods also make it possible—prior to initiating the actual molding and filling phase—to evacuate the respective parison (2) and/or to rinse with an inert gas—which may, for instance, also be hot—and, in fact, preferably via the lower outlet openings (47).

As FIGS. 9-12 show, the outlet openings (47) and (49) or the stretching rod (17a) are constructed at the peripheral surface or girthed area in such a way that the primary direction of radiation of the medium seeping out of the outlet openings (47) or (49) is inclined at an angle of less than 90° in relation to the longitudinal axis of the stretching rod (17a), and in fact at the lower outlet openings (47), in such a way that this angle opens up to the lower end of the stretching rod (45.1) and at the upper outlet openings (49) in such a way that this angle opens up to the end of the stretching rod (17a) facing away from the lower end of the stretching rod (45.1).

The outlet openings (47) or (49) in particular possess rounded corners or radii, so that local turbulences and cavitation are avoided, and a stable stratification occurs. Advantageously, the rounded corners of the outlet openings (47) and (49) are provided for in the area of the stretching rod, both radially inwards and radially outwards.

LIST OF REFERENCE SIGNS

1 Supply device
2 Parison
3 Transfer wheel
4 Heating apparatus
5 Outlet section
6 Heating unit
7 Transport equipment
8 Transfer wheel
9 Process wheel
10 Molding and filling station
11 Container
12 Extraction wheel
13 Output line
14 Input facility
15 Closing element
16 Mold partition
17 Stretching rod
17.1 Stricture
18 Knoll of the stretching rod
19 Base of the parison
20 Supply device
21 Filling substance
22 Multi-port metering valve
23 Interior space of the stretching rod
24 Outlet opening
25 Back-pressure valve
26 Air escape valve
27 Outlet opening
28 Terminal
29 Seal
30 Interior of the parison
31 Annular clearance
32 Longitudinal axis of the bottle or stretching rod
33 Sealing element
34 Counterpart
35 Warehouse
36 Feed opening
37 Mold
38 Closing system
39 Gripper
40 Tool tray
41 Rotary axis
42 Pipeline or wiring section
43 Carbonation unit
44 Cooling unit
45 Stretching rod body
45.1 Stretching rod end
46 Channel
47 Outlet opening
48 Channel
49 Outlet opening
50 Control valve
51 Locking ring
52 Magnetic coil
53 Control electronics
54, 55 Fluid connections
56 Channel
57 Outlet opening
58 Control valve
59 Head room
60 Control valve

The invention claimed is:

1. A method for producing containers made of a thermoplastic material filled with a liquid filling substance from parisons, comprising the steps of:
thermally conditioning the respective parisons; and
subsequently simultaneously shaping and filling each parison in a mold using at least one carbonated liquid filling substance as a pressure medium in the container during a simultaneous shaping and filling phase, wherein the parison is, during shaping at least intermittently guided by a stretching rod and stretched in an axial direction, wherein the filling substance or portions of the filling substance are introduced at least at two points in time and/or in at least two process phases with different proportions of carbon dioxide and/or at different temperatures, wherein at least the filling substance with the greater carbon dioxide concentration or the proportion of such filling substance is fed only through the stretching rod, wherein, in a second process phase chronologically following an initial process phase, the filling substance or the proportion of filling substance with the greater concentration of carbon dioxide is introduced only through the stretching rod, and in the initial process phase the filling substance or the proportion of filling substance with a lower carbon dioxide concentration is introduced either only outside the stretching rod or both through and outside the stretching rod.

2. The method in accordance with claim 1, wherein the carbon dioxide concentration of the filling substance or the proportion of filling substance in the second process phase lies 30% above the carbon dioxide concentration of the filling substance or the proportion of filling substance of the initial process phase.

3. The method in accordance with claim 2, wherein the carbon dioxide concentration of the filling substance or the proportion of filling substance in the second process phase lies 50-100% above the carbon dioxide concentration of the filling substance or the proportion of the filling substance of the initial process phase.

4. The method in accordance with claim 1, wherein a temperature of the filling substance or the proportion of the filling substance of the second process phase amounts to less than 10° C.

5. The method in accordance with claim 4, wherein the temperature of the filling substance or the proportion of the filling substance of the second process phase lies between 4° C. and 8° C.

6. The method in accordance with claim 1, wherein a part of the filling substance is fed past the stretching rod and a part of the filling substance is fed through the stretching rod.

7. The method in accordance with claim 1, wherein the stretching rod is, at least in some areas, thermally insulated in relation to the filling substance.

8. The method in accordance with claim 1, wherein, in the initial process phase, the filling substance or proportion of the filling substance without carbon dioxide or with the reduced concentration of carbon dioxide in the parison or in the container being shaped is introduced at various heights over at least two filling substance outlets, and, in the second process phase of the shaping and filling phase at least the filling substance or the proportion of the filling substance having the greater concentration of carbon dioxide is fed into the parison or the container being formed at a lower height, where, in the second process phase, the introduction of the filling substance or the proportion of the filling substance without carbon dioxide or having the reduced concentration of carbon dioxide occurs at a greater height, above the lower height.

9. The method in accordance with claim 8, wherein, in a third process phase between the initial and second process phases, pre-cooling of a fluid connection is carried out by the cooled filling substance or the cooled proportion of filling substance without carbon dioxide or with the reduced concentration of carbon dioxide, via which, in the second process phase, the filling substance or the proportion of filling substance with the greater concentration of carbon dioxide is supplied, to be introduced into the parison or into the container taking shape.

10. The method in accordance with claim 1, wherein the process phases are partial phases of the shaping and filling phase.

11. The method in accordance with claim 1, wherein the filling substance or the proportion of such filling substance with a greater carbon dioxide concentration is cooled; and/or the filling substance or the proportion of filling substance with the greater concentration of carbon dioxide has a lower temperature than the filling substance or the proportion of the filling substance of a first process phase.

12. The method in accordance with claim 11, wherein the filling substance or the proportion of filling substance with the greater concentration of carbon dioxide is cooled before being introduced.

13. The method in accordance with claim 12, wherein a pressure of the filling substance or the proportion of the filling substance possessing the greater carbon dioxide concentration and/or the lower temperature is at least intermittently higher than a pressure of at least one other or a remaining proportion of the filling substance during the shaping and filling phase, by at least 1 bar.

14. The method in accordance with claim 13, wherein the pressure on a partial line section is greater than the pressure of the filling substance or the proportion of the filling substance possessing the greater carbon dioxide concentration and/or the lower temperature, and, at least intermittently, by 2 bars to 5 bars higher than the pressure of at least one other or a remaining proportion of the filling substance during the shaping and filling phase.

15. The method in accordance with claim 13, wherein a Venturi nozzle or a cross-sectional narrowing is provided in a melt flow path of the filling substance or the proportion of the filling substance flowing within the stretching rod, wherein the Venturi nozzle or the cross-sectional narrowing is located shortly before said at least one filling substance outlet.

16. The method in accordance with claim 1, including introducing carbonation into the filling substance before the filling substance is introduced into the container for shaping and filling.

* * * * *